US006848829B2

(12) United States Patent
Hafen et al.

(10) Patent No.: US 6,848,829 B2
(45) Date of Patent: Feb. 1, 2005

(54) HYDRODYNAMIC BEARING ARRANGEMENT FOR A SPINDLE MOTOR

(75) Inventors: Martin Hafen, Villingen-Schwenningen (DE); Jorg Hoffmann, Mettlach (DE); Andreas Kull, Villingen-Schwenningen (DE); Mathias Wildpreth, Villingen-Schwenningen (DE)

(73) Assignee: Minebea Co., Ltd. (JP)

( * ) Notice: Subject to any disclaimer, the term of this patent is extended or adjusted under 35 U.S.C. 154(b) by 69 days.

(21) Appl. No.: 10/324,398

(22) Filed: Dec. 20, 2002

(65) Prior Publication Data

US 2003/0123764 A1 Jul. 3, 2003

(30) Foreign Application Priority Data

Jan. 3, 2002 (DE) .......................................... 102 00 089

(51) Int. Cl.[7] .............................................. F16C 32/06
(52) U.S. Cl. ...................................... 384/114; 384/119
(58) Field of Search ................................. 384/119, 114, 384/132; 360/99.08, 98.07

(56) References Cited

U.S. PATENT DOCUMENTS

| | | | | | |
|---|---|---|---|---|---|
| 5,765,952 | A | * | 6/1998 | Dekker et al. | 384/132 |
| 6,036,369 | A | * | 3/2000 | Ichiyama | 384/119 |
| 6,698,931 | B2 | * | 3/2004 | Hino | 384/107 |
| 2003/0012465 | A1 | * | 1/2003 | Nakamura | 384/100 |

* cited by examiner

*Primary Examiner*—Thomas R. Hannon
(74) *Attorney, Agent, or Firm*—Joel Lutzker; Anna Vishev; Schulte Roth & Zabel LLP

(57) ABSTRACT

A hydrodynamic bearing system for use in a spindle motor, especially for the actuation of hard disk drives, wherein the bearing arrangement features a shaft and a sleeve which, supported by a lubricant circulating between their bearing surfaces, are rotatable relative to one another. A reservoir for the lubricant is formed by a recess provided in the shaft and the inner surface of the sleeve. The reservoir is provided in the area of the face of at least one opening in the sleeve. To enable the fill level of the lubricant in the reservoir to be checked, the recess is provided with tapering transitional areas contours of which form an acute angle with the cutting plane of the shaft.

8 Claims, 4 Drawing Sheets

HYDRODYNAMIC BEARING ARRANGEMENT FOR A SPINDLE MOTOR

CROSS-REFERENCE TO RELATED APPLICATIONS

This application claims all rights of priority to German Patent Application Serial No. 102 00 089.1, filed Jan. 3, 2002 (pending).

BACKGROUND

The invention relates to a hydrodynamic bearing arrangement for a spindle motor used, for example, for actuation of hard disk drives.

Conventional spindle motors consist essentially of a stator, a rotor and at least one bearing system provided therebetween. The rotor, driven by an electric motor, is rotatably supported in relation to the stator by means of the bearing system. Both rolling bearings and hydrodynamic slide bearings can be used as bearing systems.

A hydrodynamic bearing system comprises a bearing sleeve and a shaft, which is provided in an axial borehole of the bearing sleeve. The shaft rotates freely in the bearing sleeve supported by a radial bearing formed by the shaft and the sleeve. A liquid or gas, used as lubricant between the bearing surfaces, is located in a bearing gap that separates moving bearing surfaces of the shaft and the sleeve. During operation, the lubricant, preferably oil, forms a portative lubricating film between the bearing surfaces. At least one of the reciprocally interacting bearing surfaces of the shaft and/or sleeve is provided with a grooved pattern which, as a result of the relative motion generated by rotation, exerts a pumping effect on the lubricant, thus generating the hydrodynamic pressure needed to provide bearing rigidity.

The specific advantages of hydrodynamic slide bearings over rolling bearings are greater operating precision, lack of sensitivity to impact stress (shock), and a smaller number of components. Since the sliding components do not come into contact with one another at the rated rotation speed, they operate with little wear and virtually without sound.

The amount of the lubricant filled into such a bearing system is critical to its reliable operation. A fill level that is only slightly lower than the correct fill level can significantly reduce the life of the bearing system, while an excess level can lead to subsequent leakage of the lubricant, thereby destroying the hard disk drive. A conventional bearing system is typically filled with a defined amount of lubricant following the assembly of the bearing system. In current bearing designs, it is not possible to check the fill level after the lubricant has been filled into the system to ensure that the fill level is correct.

BRIEF SUMMARY

The object of the invention is to provide a hydrodynamic bearing arrangement for a spindle motor allowing to verify the fill level of the lubricant easily and reliably.

According to the invention, the fluid dynamic bearing system is provided having a bearing sleeve and a shaft. A recess is provided on the shaft, the recess forming tapering transitional areas. One of the transitional areas is located below the opening surface of the bearing gap. The other transitional area is located above the opening surface of the bearing gap. Contours of the transitional areas form acute angles α and β with the cutting plane of the shaft, i.e., the plane perpendicular to the shaft's axis.

The transitional area located below the opening surface of the bearing gap, i.e., inside the sleeve, forms an intermediate space together with the inner wall of the sleeve. This intermediate space serves as a reservoir for the lubricant, which is being confined in this intermediate space by capillary forces.

The transitional area located above the opening surface of the bearing gap, i.e., outside the sleeve, advantageously facilitates viewing and inspecting the fill level of the lubricant in the reservoir.

The angles α and β formed by the transitional areas range from 0° to 90°, preferably from 70° to 80°. In a preferred embodiment of the invention, the transitional area located inside the sleeve has a smaller angle than the transitional area located outside the sleeve. This creates a sufficiently large reservoir with an unobstructed view for checking the fill level. The length of the transitional area located inside the sleeve is preferably greater than the length of the transitional area located outside the sleeve.

The contour of the transitional area is essentially random. It can progress in a straight or curved line, i.e., the contour can be spherical, convex, concave, etc. Consequently, angles α and β can be constant or can intermittently change along the length of the respective transitional area.

The bearing system constructed in accordance with the present invention, can be realized in both spindle motors with a rotating shaft and spindle motors with a fixed shaft.

The above aspects, advantages and features are of representative embodiments only. It should be understood that they are not to be considered limitations on the invention as defined by the claims. Additional features and advantages of the invention will become apparent in the following description, from the drawings, and from the claims.

BRIEF DESCRIPTION OF THE DRAWINGS

The invention is illustrated by way of example and not limitation and the figures of the accompanying drawings in which like references denote like or corresponding parts, and in which.

DETAILED DESCRIPTION

In the preferred embodiment of the present invention, a hydrodynamic bearing system is provided for use in a spindle motor. The spindle motor described in the present disclosure assumes that the rotor is carried by a rotational shaft. However, the invention also encompasses the structural form of spindle motors in which a sleeve connected to a rotor is rotatably borne on a fixed shaft.

Figure 1:
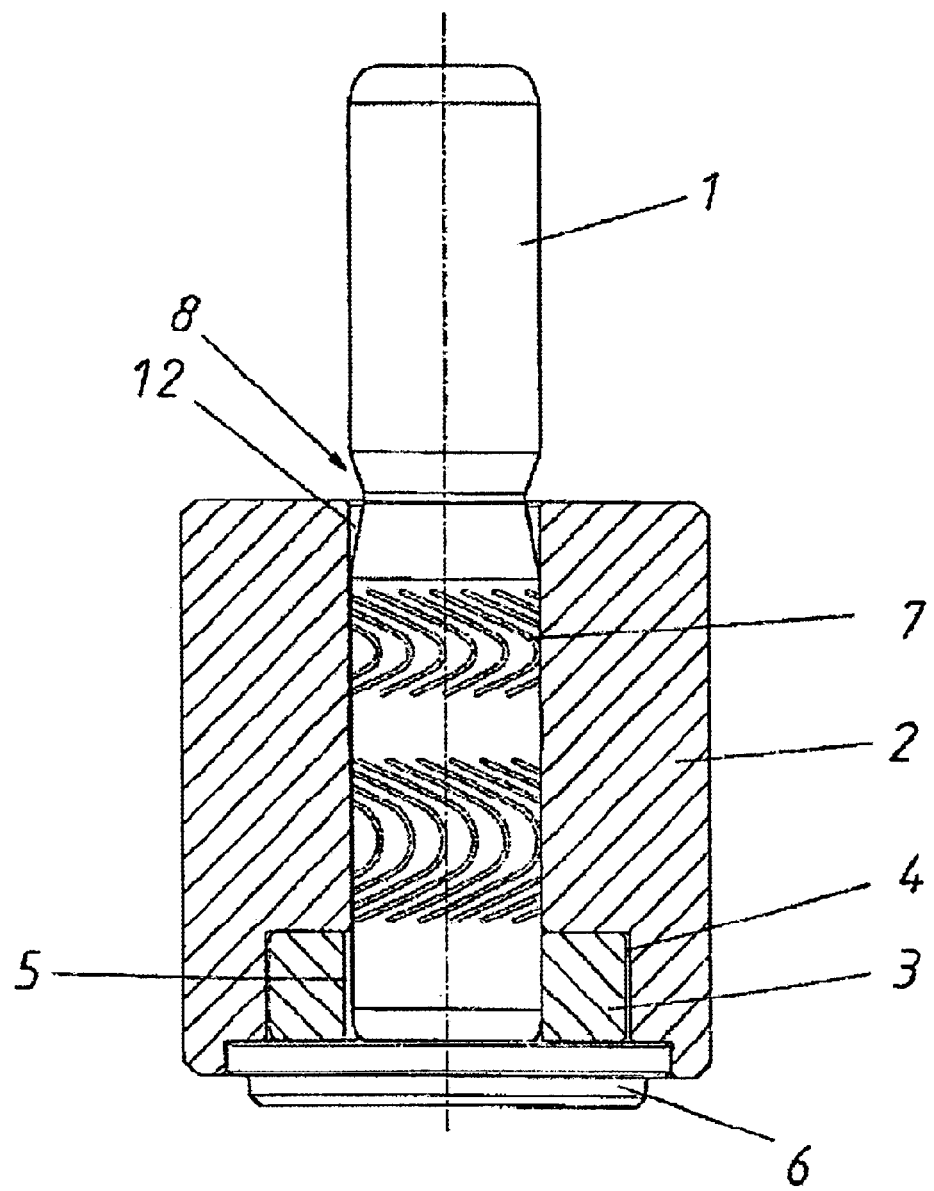
FIG. 1 is a cross-sectional view of the preferred embodiment of the fluid dynamic bearing system without lubricant.
Figure 3:
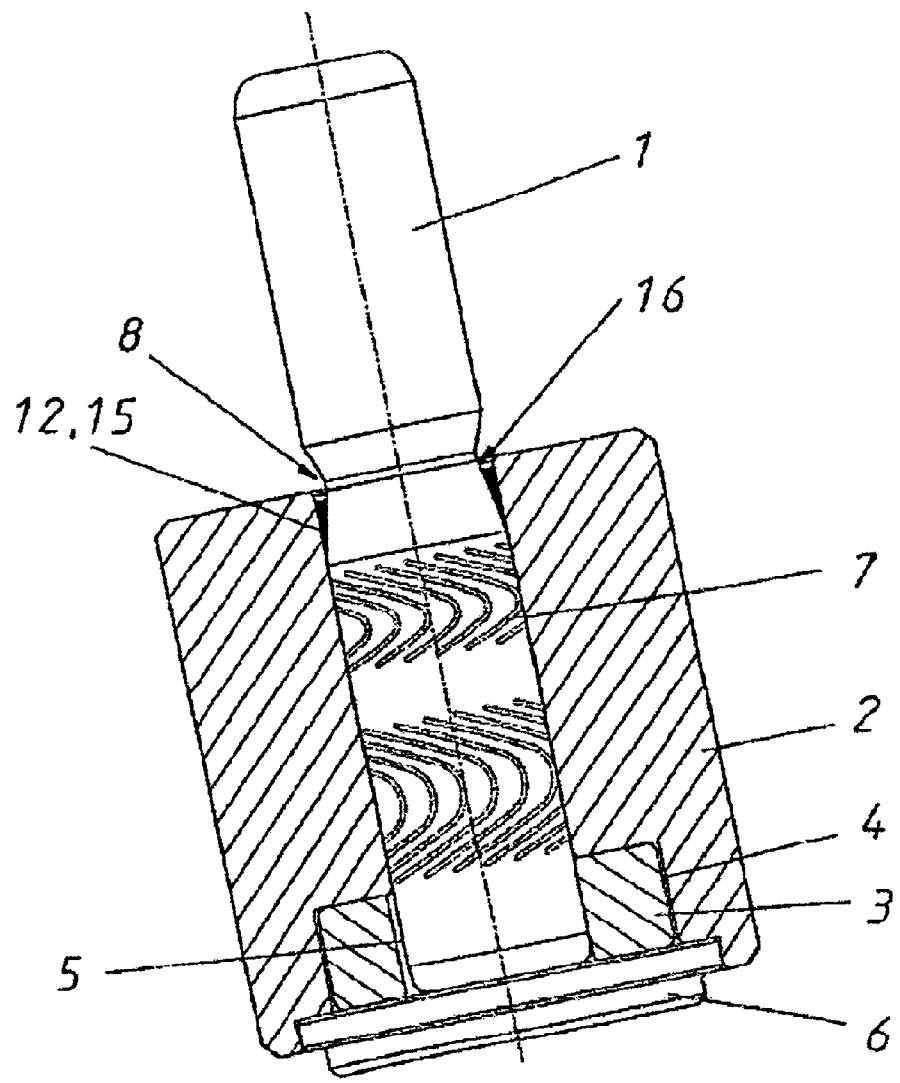
FIG. 3 is a cross-sectional view of the preferred embodiment of the fluid dynamic bearing system with lubricant filled into it.

As shown in FIGS. 1 and 3, the bearing system preferably comprises a shaft 1 supported for a free rotation in a sleeve 2. The outer surface of the shaft and the inner surface of the sleeve form opposing bearing surfaces. One of these surfaces (the outer surface of the shaft 1 in FIGS. 1 and 3) is provided with cylindrical zones incorporating grooved patterns 7.

The lower face of the sleeve 2 is provided with an annular recess 4 for acceptance of a thrust plate 3. Thrust plate 3 is fixedly mounted on the shaft 1 and as the shaft freely rotates within the sleeve, the thrust plate freely rotates in the recess 4. Thrust plate 3 features a concentric borehole for acceptance of the shaft 1, wherein several recesses 5 can be distributed along the circumference of the borehole. These recesses 5 form lubricant channels between the thrust plate 3 and the shaft 1, and enable the distribution of the lubricant. A lower opening of the sleeve 2 is hermetically sealed by a lid 6, which prevents air from penetrating into the bearing system.

When the shaft 1 rotates in the sleeve 2, grooves 7 generate a pumping action leading to pressure development and distribution of the lubricant 15, which fills the space between the sleeve 2 and the shaft 1. The relative motion of the opposing surfaces of the shaft 1 having the thrust plate 3 and the sleeve 2 pumps the lubricant 15 through the bearing gap. The direction of this pumping action depends on the direction of rotation and the shape and/or orientation of the grooved pattern 7. Thus, the lubricant circulates in the intermediate space between the sleeve 2 and the shaft 1, and also circulates around the thrust plate in the intermediate space between the sleeve 2 and the thrust plate 3. As a result of this pumping action, several zones of hydrodynamic pressure are formed along the radial bearing formed by the grooved pattern 7. Similarly, a zone of hydrodynamic pressure is formed around the axial bearing formed by the thrust plate 3. Thus, a continuous lubricant film is maintained between the parts rotating relative to one another enabling a stable, concentric rotation between the shaft 1 and the sleeve 2. The rigidity of the bearing system is determined by the gap width, the viscosity of the lubricant, and the shape of the grooved pattern.

As shown in FIGS. 1 and 3, shaft 1 features a recess 8 located in the area of the upper face of the sleeve 2. Recess 8, in cooperation with the inner surface of the sleeve 2, forms a reservoir 12 for acceptance of the lubricant 15. The largest constriction of the shaft, i.e., the smallest diameter at the base 10 of the recess, lies in the area of the upper face of the sleeve 2.

Figure 2:
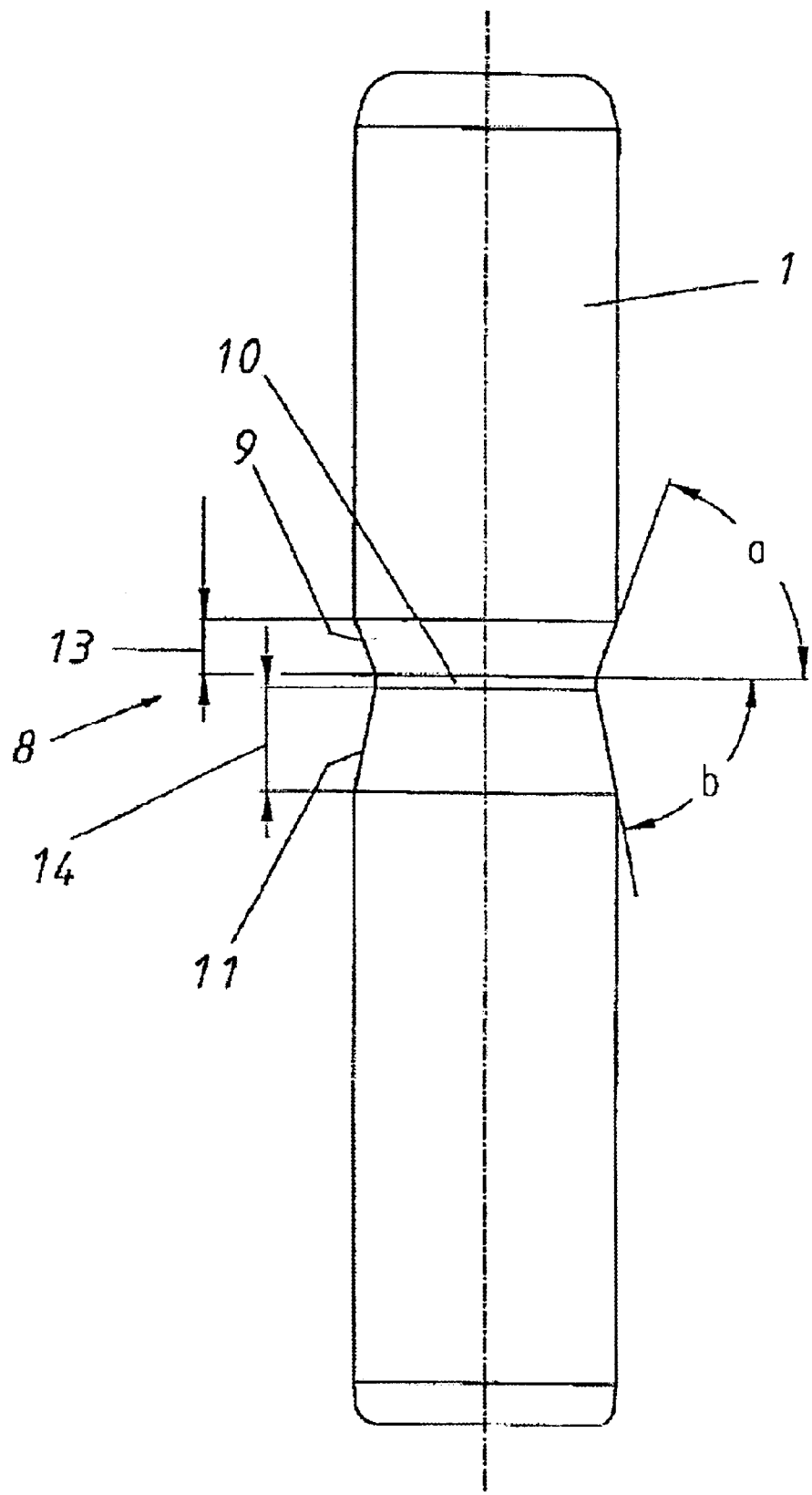
FIG. 2 is a cross-sectional view of the shaft formed according to the invention.
Figure 4:
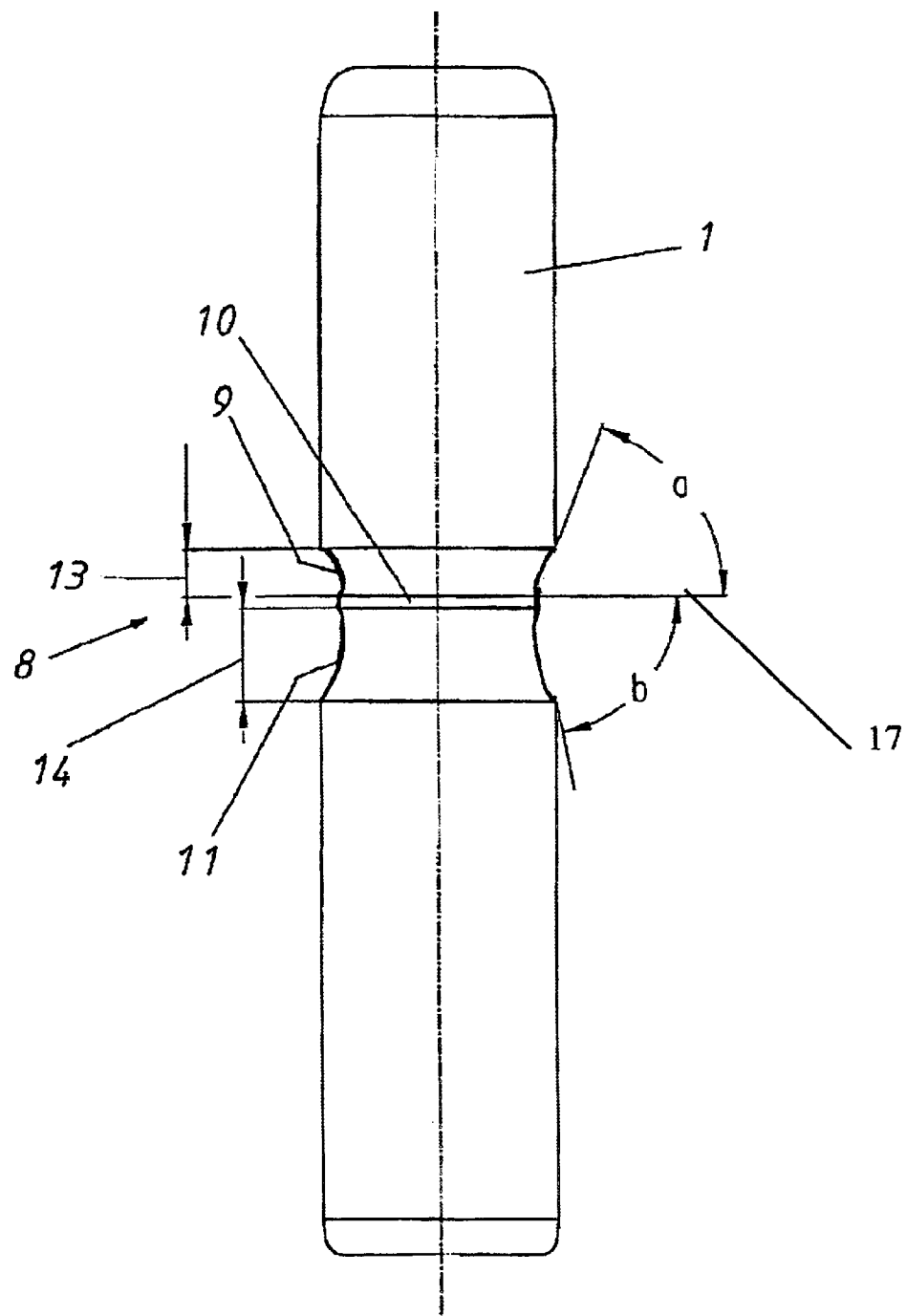
FIG. 4 is a cross-sectional view of the shaft formed according to the invention.

FIG. 2 shows an enlarged view of the shaft 1 with the recess 8. Beginning from the outer surface of shaft 1, the shaft s diameter decreases along a transitional area 9, having length 13 and inclined at an angle $\alpha$, until the base 10 of the recess is reached. The diameter of the shaft 1 then increases along a transitional area 11, having length 14 and inclined at an angle $\beta$, until the outer surface of the shaft having the original diameter is reached. Thus, transitional areas 9 and 11 taper inwardly. The respective lengths 13 and 14 of the transitional areas 9 and 11, respectively, as well as the angles $\alpha$ and $\beta$ they form with the cutting plane 17 of the shaft 1, can vary and can take various shapes. For example, transitional areas 9 and 11 can have curved contour, as shown in FIG. 4. It is important, however, that the transitional areas form acute angles $\alpha$ and $\beta$ with respect to the cutting plane 17 of the shaft. The angles $\alpha$ and $\beta$ formed by the transitional areas range from 0° to 90°, preferably from 70° to 80°.

In a preferred embodiment of the invention, the transitional area located inside the sleeve forms a smaller angle with the axis of the shaft than the transitional area located outside the sleeve. This creates a sufficiently large reservoir with an unobstructed view for checking the fill level. The length of the transitional area located inside the sleeve is preferably greater than the length of the transitional area located outside the sleeve.

Once the bearing system is completely assembled, the reservoir 12 can be filled with lubricant 15, preferably oil, as shown in FIG. 3. The fill level of the lubricant in the reservoir 12 can then be visually checked using the lubricant concave meniscus 16 formed in the reservoir as a result of capillary action. Because of the inclination of the upper transitional area 9 on the shaft 1, the fill level of the reservoir 12 can be easily viewed from above.

For the convenience of the reader, the above description has focused on a representative sample of all possible embodiments, a sample that teaches the principles of the invention and conveys the best mode contemplated for carrying it out. The description has not attempted to exhaustively enumerate all possible variations. Other undescribed variations or modifications may be possible. For example, where multiple alternative embodiments are described, in many cases it will be possible to combine elements of different embodiments, or to combine elements of the embodiments described here with other modifications or variations that are not expressly described. Many of those undescribed variations, modifications and variations are within the literal scope of the following claims, and others are equivalent.

The invention claimed is:

1. A hydrodynamic bearing system for a spindle motor, said bearing system comprising:

a shaft having an outer surface;

a sleeve having an inner surface, one of said shaft and said sleeve being rotatable with respect to the other; and a lubricant circulating between said inner and outer surfaces, wherein a lubricant reservoir is defined by a recess in said shaft and said inner surface of said sleeve, wherein said reservoir is provided in the area of at least one opening of said sleeve, wherein said recess further comprises a first tapering transitional area and a second tapering transitional area, wherein contours of said tapering transitional areas form acute angles with the cutting plane of said shaft, wherein said first tapering transitional area is located inside said sleeve, wherein said second tapering transitional area is located outside said sleeve, and wherein said first tapering transitional area is inclined with respect to an axis of said shaft at a smaller angle than said second tapering transitional area.

2. The hydrodynamic bearing system according to claim 1, wherein said acute angles range from 70° to 80°.

3. The hydrodynamic bearing system according to claim 1, wherein a length of said first tapering transitional area is greater than a length of said second tapering transitional area.

4. The hydrodynamic bearing system according to claim 1, wherein said contours of said tapering transitional areas comprise a straight line.

5. The hydrodynamic bearing system according to claim 1, wherein said contours of said tapering transitional areas comprise a curved line.

6. The hydrodynamic bearing system according to claim 1, wherein said acute angles are constant along the length of their respective tapering transitional areas.

7. The hydrodynamic bearing system according to claim 1, wherein said acute angles continuously change along the length of their respective tapering transitional areas.

8. The hydrodynamic bearing system according to claim 1, wherein said acute angles change along the length of their respective tapering transitional areas.

* * * * *